Patented Feb. 21, 1933

1,898,431

UNITED STATES PATENT OFFICE

OSKAR DRESSEL AND ANTON OSSENBECK, OF COLOGNE-MULHEIM, AND ERNST TIETZE, OF COLOGNE-ON-THE-RHINE, GERMANY, ASSIGNORS TO WINTHROP CHEMICAL COMPANY, INC., OF NEW YORK, N. Y., A CORPORATION OF NEW YORK

WATERSOLUBLE UREA COMPOUNDS CONTAINING HETEROCYCLIC NUCLEI IN THE MOLECULE

No Drawing. Application filed November 30, 1929, Serial No. 410,871, and in Germany December 5, 1928.

The present invention relates to a process of preparing watersoluble pharmaceutical substances being chemically urea compounds containing heterocyclic nuclei in the molecule and to the new products obtainable thereby, more particularly it relates to compounds of the probable general formula:

(Ar.NH$x$.NH$x$—NH—)$_\overline{2}$-C.$y$ wherein "Ar" stands for a benzene or naphthalene nucleus containing at least one sulfonic acid group, one $x$ stands for a heterocylic nucleus attached to the adjacent nitrogen atoms by nuclear carbon atoms, for example, for the residue of acridine, quinazoline, quinoline, pyridine, pyrimidine and triazine, the other $x$ stands for a heterocyclic nucleus attached to the adjacent nitrogen atoms by nuclear carbon atoms, or for a -CO-aryl-or SO$_2$-aryl-radical of the benzene series, such as benzoyl- or benzenesulfonyl, and $y$ stands for an oxygen or a sulfur atom.

Our new products are obtainable by condensing in aqueous solution an aromatic amine of the benzene or naphthalene series containing at least one sulfonic acid group in water and which may be otherwise substituted with a heterocyclic compound containing a replaceable halogen atom and a nitro group, for example, a 4-chloro-6-nitro-quinazoline, favorably in the presence of an acid-binding agent, such as sodium acetate, or with an aromatic acid halogenide containing a nitro group, such as nitrobenzoylchloride or nitrobenzenesulfochloride, reducing the nitro group of the condensation product and again effecting condensation in the same manner with an aromatic acid halogenide containing a nitro group in the nucleus in case the first condensation has been effected with a heterocyclic compound, or with a heterocyclic nitro compound containing a replaceable halogen atom, reducing the nitro group and transforming the reduction product into the corresponding urea or thiourea according to one of the known methods, for example by means of phosgene or thiophosgene respectively.

Our new products are generally yellowish crystalline substances, soluble in water and are valuable pharmaceutical substances, especially against blood parasites.

The invention is illustrated by the following examples, without being limited thereto:

*Example 1.*—50 kgs. of sodium-1-naphthylamine-4.6.8-trisulfonate are dissolved in water, 25 kgs. of sodium acetate are added and the solution is heated to 50–60° C. 25 kgs. of finely powdered 6-nitro-4-chloroquinazoline are then added with stirring, which is continued until an acidified test portion no longer absorbs nitrite. After filtering, the solution is reduced directly in the customary manner with iron and acetic acid. It is then again filtered, concentrated, if necessary by evaporation, acidified with hydrochloric acid and saturated with sodium chloride. The acid then separates slowly as a crystalline magma. The latter is filtered and redissolved to a neutral solution; 25 kgs. of sodium acetate are added and after the addition of 20 kgs. of 3-nitro-4-methyl-benzoylchloride stirring takes place at 20–30° C. until in an acidified test portion no further absorption of nitrite is observable. After filtering, the condensation product is salted out with sodium chloride, filtered, reduced with iron and acetic acid and the amino-acid obtained is separated from the reduction liquid by means of hydrochloric acid and sodium chloride in the form of a crystalline magma.

For conversation into the urea the amino acid is dissolved to a neutral solution in water, sodium acetate is added and phosgene is passed in at 30–40° C. until the amino-acid is no longer detectable by the diazo reaction. During the passing in of the phosgene, the free acid evolved is advantageously neutralized by the addition of alkali. The urea is precipitated from the aqueous solution by means of alcohol as a dark yellow resin, which solidifies on standing and after drying forms a yellow powder. It is effective against trypanosomes, especially against trypanosoma evansdense. In its free form it has the following formula:—

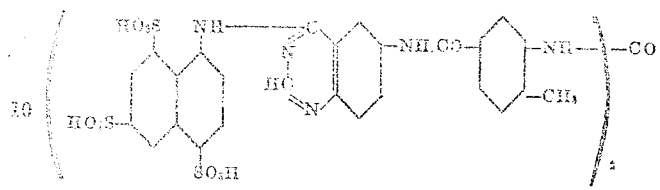

Example 2.—The 6'-amino-4'-quinazolyl-1-naphthylamine-4.6.8-trisulfonic acid, obtainable as described in Example 1, is dissolved in water to a neutral solution, 25 kgs. of sodium acetate are added and stirring is then effected at 50-60° C. with 25 kgs. of 6-nitro-4-chloro-quinazoline (finely powdered) until the amino group is no longer detectable by diazotization. The condensation product separates in part already during the process. The whole is dissolved by increased heating, filtered and salted out with sodium chloride. The magma is filtered and then reduced in the customary manner with iron and acetic acid, and the amino acid is separated from the reduction liquid with hydrochloric acid and sodium chloride. The filtered amino-acid is then converted into the urea by treatment with phosgene as described in Example 1 and the urea is precipitated from the aqueous solution as a yellow precipitate by the addition of alcohol.

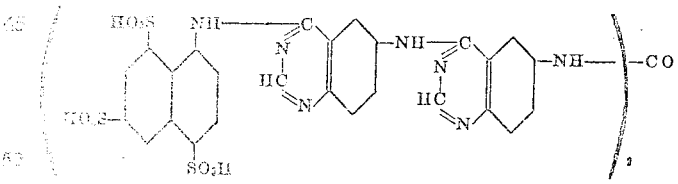

Example 3.—On shaking a neutral aqueous solution of sodium-3'-aminobenzoyl-2-naphthylamine - 4.6.8 - sodium - trisulfonate (prepared by condensation of m-nitrobenzoylchloride with 2-naphthylamine-4.6.8-trisulfonic acid in aqueous solution with the addition of an acid-binding agent, analogously to the process as described in Example 1, followed by reduction) to which sodium acetate has been added, with rather more than the molecular quantity of 1-nitro-9-chloroacridine, dissolved in benzene, the reaction mass solidifies after a short time to a solid crystal magma of 1''-nitro-9''-acridyl-3'-aminobenzoyl-2-naphthylamine-4.6.8-trisulfonic acid, which is filtered and reduced in the customary manner with iron and acetic acid. The amino compound, dissolved in water, yields on passing in phosgene a normal urea, which is precipitated by the addition of alcohol in the form of a resin. In its free form it has the following formula:

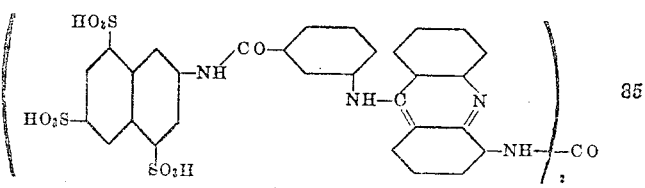

Example 4.—Aniline-3.5-disulfonic acid is condensed with 6-nitro-4-chloroquinazoline as described in example 1, reduced and condensed with m-nitrobenzoylchloride. After reduction of the nitro group phosgene is introduced into the acetic acid solution until the amino-group is no longer detectable by diazotization. The urea formed is salted out with sodium chloride as a yellowish-brown powder. It has in its free state the following formula:

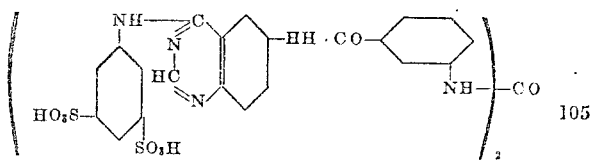

Example 5.—On shaking a neutral aqueous solution of 1-naphthylamine-4.6.8-sodium trisulfonate to which sodium acetate has been added with a benzene solution of 6-nitro-7-methyl-4-chloroquinazoline, the 6-nitro-7-methyl - quinazolyl-1-naphthylamine - 4.6.8-trisulfonic acid is obtained which is reduced in the known manner with iron and acetic acid. The reduction product is condensed with m-nitrobenzoylchloride, the nitro compound is reduced and the amino compound transformed into the corresponding urea by introducing phosgene. The urea is salted out by the addition of common salt and is obtained in form of a yellow powder. In its free state it has the following formula:

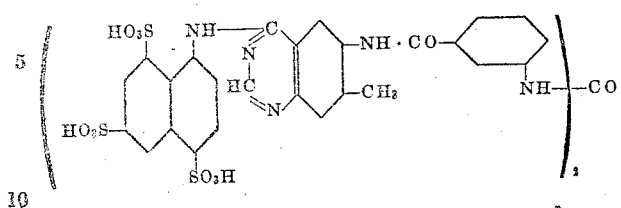

*Example 6.*—6-nitrobenzothiazolyl-2-naphthylamine-4.7-disulfonic acid is prepared by heating in an autoclave to about 105–110° C. about equimolecular quantities of 2-naphthylamine-4.7-disodium sulfonate and 6-nitro-2-chlorobenzothiazole (compare British Specification No. 310,815) in the presence of an acid-binding agent, for example sodium acetate. The nitro-compound is reduced with iron and acetic acid and the amino compound is condensed with m-nitrobenzoylchloride. After reduction of the nitro group the thiourea is formed by introducing into the acetic acid solution thiophosgene until the amino group is no longer detectable by diazotization. The thiourea is separated by the addition of common salt; it is a yellow powder, effective against blood parasites.

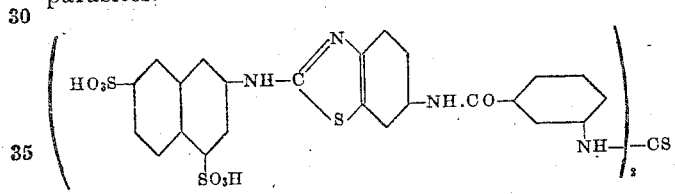

Analogous compounds are obtainable by using other heterocyclic compounds, for example as are described in the Brit. Specifications 255,811, 309,033 and 310,815.

If in Examples 1–5 phosgene is substituted by thiophosgene the corresponding thioureas are obtainable which correspond to the ureas as regards the efficiency against blood parasites.

We claim:

1. As new products compounds of the probable general formula:

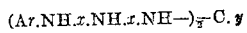

wherein "$Ar$" stands for a benzene or naphthalene nucleus containing at least one sulfonic acid group as substituent, one $x$ stands for a heterocyclic nucleus attached to the adjacent nitrogen atoms by nuclear carbon atoms, the other $x$ stands for a residue of the group consisting of a heterocyclic nucleus attached to the adjacent nitrogen atoms by nuclear carbon atoms, and the groups -CO-aryl- and -$SO_2$-aryl- of the benzene series, and $y$ stands for one of the atoms oxygen and sulfur, being generally yellowish crystalline substances, soluble in water and being valuable pharmaceutical substances, especially against blood parasites.

2. As new products compounds of the probable general formula:

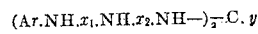

wherein "$Ar$" stands for a naphthalene nucleus being at least once substituted by a sulfonic acid group, $x_1$ stands for a heterocyclic nucleus attached to the adjacent nitrogen atoms by nuclear carbon atoms, $x_2$ stands for one of the groups -CO-aryl- and -$SO_2$-aryl of the benzene series, and $y$ stands for one of the atoms oxygen and sulfur, being generally yellowish crystalline substances, soluble in water and being valuable pharmaceutical substances, especially against blood parasites.

3. As new products compounds of the probable general formula:

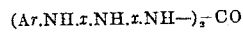

wherein "$Ar$" stands for a benzene or naphthalene nucleus containing at least one sulfonic acid group as substituent, one $x$ stands for a heterocyclic nucleus attached to the adjacent nitrogen atoms by nuclear carbon atoms, the other $x$ stands for a residue of the group consisting of a heterocyclic nucleus attached to the adjacent nitrogen atom by nuclear carbon atoms, and the groups -CO-aryl- and -$SO_2$-aryl- of the benzene series, being generally yellowish crystalline substances, soluble in water and being valuable pharmaceutical substances, especially against blood parasites.

4. As new products compounds of the probable general formula:

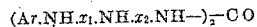

wherein "$Ar$" stands for a naphthalene nucleus being at least once substituted by a sulfonic acid group, $x_1$ stands for a heterocyclic nucleus attached to the adjacent nitrogen atoms by nuclear carbon atoms, $x_2$ stands for one of the groups -CO-aryl- and -$SO_2$-aryl- of the benzene series, being generally yellowish crystalline substances, soluble in water and being valuable pharmaceutical substances, especially against blood parasites.

5. As new products compounds of the probable general formula:

Ar.N"H.x.N'H.CO.R.NH—)₂—CO wherein "Ar" stands for a naphthalene nucleus being at least once substituted by a sulfonic acid group, x stands for a quinazoline nucleus attached with a carbon atom of the diazine nucleus to the nitrogen atom N" and with a carbon of the benzene nucleus to the nitrogen N' atom and R stands for a radical of the benzene series, being generally yellowish crystalline substances, soluble in water and being valuable pharmaceutical substances, especially against blood parasites.

6. As new products compounds of the probable general formula:

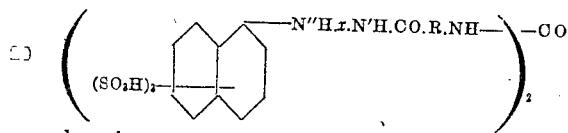

wherein x stands for a quinazoline nucleus attached with a carbon atom of the diazine nucleus to the nitrogen atom N" and with a carbon atom of the benzene nucleus to the nitrogen atom N' and R stands for a radical of the benzene series, being generally yellowish crystalline substances, soluble in water and being valuable pharmaceutical substances, especially against blood parasites.

7. As a new product the compound of the probable formula:

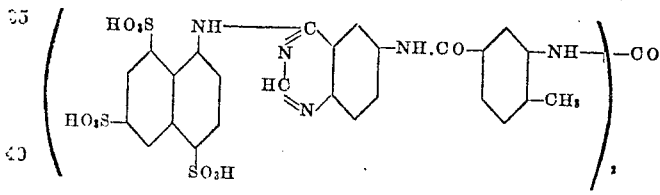

being a yellow powder, effective against trypanosomes, especially against trypanosoma congolense.

In testimony whereof, we affix our signatures.

OSKAR DRESSEL.
ANTON OSSENBECK.
ERNST TIETZE.